United States Patent
Hoke et al.

(10) Patent No.: US 7,540,904 B2
(45) Date of Patent: Jun. 2, 2009

(54) HYDROCARBON ADSORPTION SLURRY WASHCOAT FORMULATION FOR USE AT LOW TEMPERATURE

(75) Inventors: Jeffrey Barmont Hoke, North Brunswick, NJ (US); Mark Thomas Buelow, Phillipsburg, NJ (US); John Joseph Kauffman, Hazlet, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 579 days.

(21) Appl. No.: 11/281,629

(22) Filed: Nov. 17, 2005

(65) Prior Publication Data

US 2007/0107599 A1 May 17, 2007

(51) Int. Cl.
*B01D 53/02* (2006.01)

(52) U.S. Cl. .............. 96/108; 96/153; 585/820

(58) Field of Classification Search ............ 96/108, 96/153; 585/820
See application file for complete search history.

(56) References Cited

U.S. PATENT DOCUMENTS

| | | | |
|---|---|---|---|
| 4,027,367 A | 6/1977 | Rondeau | |
| 4,308,841 A | 1/1982 | Kingsley | |
| 4,750,465 A | 6/1988 | Rediker, Jr. et al. | |
| 4,877,001 A | 10/1989 | Kenealy et al. | |
| 4,985,210 A | 1/1991 | Minami | |
| 5,051,244 A | 9/1991 | Dunne et al. | |
| 5,094,218 A | 3/1992 | Everingham et al. | |
| 5,125,231 A | 6/1992 | Patil et al. | |
| 5,158,753 A | 10/1992 | Take et al. | |
| 5,241,940 A | 9/1993 | Gates, Jr. | |
| 6,090,738 A * | 7/2000 | Choudary et al. | 502/62 |
| 6,171,556 B1 | 1/2001 | Burk et al. | |
| 6,432,179 B1 | 8/2002 | Lobovsky et al. | |
| 6,543,427 B2 | 4/2003 | Kawasaki | |
| 6,792,749 B2 | 9/2004 | Ueno et al. | |
| 6,863,984 B2 | 3/2005 | Hoke et al. | |
| 7,141,232 B2 * | 11/2006 | Miller et al. | 423/716 |
| 7,422,628 B2 * | 9/2008 | Foong et al. | 96/108 |
| 2002/0029693 A1 | 3/2002 | Sakakibara et al. | |
| 2003/0192512 A1 | 10/2003 | Luley et al. | |
| 2004/0226440 A1 | 11/2004 | Foong et al. | |

FOREIGN PATENT DOCUMENTS

| | | |
|---|---|---|
| CN | 1059701 A | 3/1992 |
| JP | 2004008940 A * | 1/2004 |
| WO | PCT/US2006/043976 | 3/2007 |

OTHER PUBLICATIONS

Society of Automotive Engineers Publication No. 920847, Heimrich, et al., "Cold-Start Hydrocarbon Collection for Advanced Exhaust Emission Control", Feb. 24-28, 1992.
U.S. Appl. No. 11/282,814, Hoke et al., "Hydrocarbon Adsorption Method and Device for Controlling Evaporative Emissions from the Fuel Storage System of Motor Vehicles", Nov. 18, 2005.
U.S. Appl. No. 11/281,349, Buelow et al., "Hydrocarbon Adsorption Filter for Air Intake System Evaporative Emission Control", Nov. 17, 2005.
U.S. Appl. No. 11/281,662, Hoke et al., Hydrocarbon Adsorption Trap for Controlling Evaporative Emissions from EGR Valve, Nov. 17, 2005.
English language Abstract for CN 1059701A, Kuixi et al., "High Silicon Beta Zeolite", Mar. 25, 1992.

* cited by examiner

*Primary Examiner*—Robert A Hopkins
(74) *Attorney, Agent, or Firm*—Melanie L. Brown

(57) ABSTRACT

The present invention is directed to an improved hydrocarbon adsorbent slurry washcoat formulation, which can be used for controlling evaporative hydrocarbon emissions from a motor vehicle. More specifically, the present invention is directed to an improved slurry composition of the present invention comprises one or more hydrocarbon adsorbent materials, and an organic polymer binder containing an anionic dispersant and/or stabilizing pH. The binder is used to improve the adhesion of the hydrocarbon adsorbent to the surface of the fuel storage, fuel delivery, or air intake system component.

20 Claims, No Drawings

US 7,540,904 B2

HYDROCARBON ADSORPTION SLURRY WASHCOAT FORMULATION FOR USE AT LOW TEMPERATURE

FIELD OF THE INVENTION

This invention is directed to the use of an improved hydrocarbon adsorbent washcoat formulation for use at low temperatures. In particular, this invention relates to the use of an improved hydrocarbon adsorbent washcoat formulation for controlling evaporative hydrocarbon emissions from motor vehicles.

BACKGROUND OF THE INVENTION

Evaporative emission regulations for vehicles require the control of polluting substances (primarily hydrocarbons) from the vehicle as it sits unused. These emissions are leaked out of the vehicle from many sources including the air intake system. In the past, only emissions from the fuel tank were captured, with carbon-filled canisters, but this has now been expanded to other vehicle components such as the air intake system. These harmful substances need to be retained within the air inlet system until the powertrain is again used. At such time, the retention system will give up the harmful substances to be consumed and controlled through the normal exhaust emission control systems.

There are several ways to control the outward flow of pollutants from the air intake system of an automobile. One such technique is the careful shaping of the ducting and filter box. However, this method is often not sufficient to meet the regulatory requirements. Accordingly, other methods must be used such as the incorporation of systems in the air intake system that use some form of carbon or other material to adsorb the pollutants during the rest cycle. When the vehicle is next started, the in-rushing air will draw the pollutants from the adsorbent and direct the pollutants through the normal exhaust system pollution controls. This inward air rush also regenerates the adsorption systems so that such systems may be reused. Unfortunately, these extra adsorption systems add cost, weight and complexity to a vehicle and often restrict the air flow.

There continues to be a push to reduce emissions from internal combustion engines. One manner in which emissions are generated from an internal combustion engine is when the engine is shut off. Fuel which has been released from fuel injectors, but has not been consumed prior to engine shut down, may evaporate outwardly through the intake manifold, the intake air ducts and air filter to eventually escape into the atmosphere and contribute to air pollution.

In additional efforts to reduce these types of inadvertent evaporative emissions, many types of filters have been developed. Examples of filters for use in the intake system of a vehicle are found in U.S. Pat. No. 6,432,179 to Lobovsky et al. and U.S. Patent Application Publication No. U.S. 2002/0029693 to Sakakibara et al., both of which are incorporated herein by reference. The publication of Sakakibara et al. discloses several embodiments of hydrocarbon adsorbing devices having a case surrounding an inner cylinder portion. A hydrocarbon adsorbent material is provided in a chamber defined by the case and the inner cylinder portion. The inner cylinder portion has a central bore that extends through its length to permit induction air to pass therethrough, and also has windows that allow any hydrocarbons in the induction system to pass through a filter surrounding the inner cylinder portion to the hydrocarbon adsorbent material in the chamber to be adsorbed thereby.

As previously mentioned, adsorption systems and methods for trapping volatile hydrocarbon fuel vapors, from the fuel tank of an automobile are also well known. Such systems are typically referred to as evaporative loss control systems and rely on a canister containing a regenerable adsorbent such as activated charcoal. The adsorbent adsorbs the volatile hydrocarbons and when engine operating conditions are appropriate for combusting the trapped hydrocarbons, a stream of air is passed through the adsorbent to desorb the adsorbent and the hydrocarbon-laden air stream is passed into the engine where the desorbed hydrocarbons are combusted. Exemplary U.S. patents disclosing evaporative loss control systems include the following: U.S. Pat. Nos. 4,877,001; 4,750,465; and 4,308,841.

Furthermore, systems and methods for adsorbing uncombusted hydrocarbons in the exhaust gas stream of an automobile are also well known. These systems and methods are particularly useful for adsorbing uncombusted hydrocarbons emitted during the cold start of the automobile engine.

For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2 of U.S. Pat. No. 4,985,210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled Cold-Start Hydrocarbon Collection for Advanced Exhaust Emission Control, SAE Publication Number 920847, discloses an apparatus which functions in a manner similar to that of U.S. Pat. No. 5,051,244.

U.S. Pat. No. 5,125,231 discloses an engine exhaust system for reducing hydrocarbon emissions, including the use of beta zeolites as hydrocarbon adsorbents. Zeolites having a silica/alumina ratio in the range of 70/1 to 200/1 are preferred adsorbents. The apparatus includes by-pass lines and valves to direct exhaust gases from a first converter directly to a second converter during cold-start operation and when the first converter reaches its light-off temperature, to either by-pass the second converter or recycle effluent from it to the first converter.

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

U.S. Pat. No. 6,171,556 discloses a method and apparatus for treating an exhaust gas stream containing hydrocarbons and other pollutants. The method comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise beta zeolites.

As discussed above, zeolites are often used as coatings on monolithic substrates for various high temperature adsorption and catalytic applications. In these cases, inorganic binder systems are used that survive exposure to high temperatures (e.g., >500° C.) and provide good coating adhesion. However, for low temperature application (e.g., <500° C.), inorganic type binders are often not suitable since their binding characteristics are severely diminished. In these low temperature applications, organic polymer binders are ideal since they are structurally stable and provide excellent coating adhesion. This is accomplished by the addition of suitable stabilizing agents to the slurry formulation.

For example, commonly assigned U.S. Patent Publication No. 2004/0226440, incorporated herein by reference, discloses a hydrocarbon adsorption unit. The unit is positioned in the air intake system of an automobile engine and has an air intake and air outlet. According to the application the adsorber material may be silica gel, a molecular sieve and/or activated carbon and contains an organic polymer binder, as well as an anionic, nonionic or cationic dispersant, that will cause the material, preferably as an aqueous slurry, to adhere to the surface of a substrate.

However, without proper choice of these stabilizing agents, interparticle agglomeration of zeolite particles or coagulation of zeolite and binder particles will occur, thus rendering the slurry unstable for coating application. As a result, a zeolite-based coating formulation must be developed that not only has good adhesion (particularly to metal substrates) at low temperature and excellent adsorption characteristics, but also is stable with adequate shelf-life.

SUMMARY OF THE INVENTION

The present invention is directed to an improved hydrocarbon adsorbent slurry washcoat formulation, which can be used for controlling evaporative hydrocarbon emissions from a motor vehicle. More specifically, the improved slurry composition of the present invention comprises one or more hydrocarbon adsorbent materials, e.g., a molecular sieve, and an organic polymer binder. The binder is used to improve the adhesion of the hydrocarbon adsorbent to the surface of the fuel storage, fuel delivery, or air intake system component. Stabilization of the slurry formulation is achieved by addition of an appropriate anionic dispersant and/or by increasing the slurry pH.

In another embodiment of the present invention the improved hydrocarbon adsorbent slurry washcoat is a zeolite-based slurry washcoat formulation.

In another embodiment of the present invention an undercoat layer can be used to further improved the adhesion of the zeolite slurry washcoat to a substrate surface. In particular, a refractory oxide support can be used to further improve the adhesion of the hydrocarbon adsorbent to the surface of a fuel storage, fuel delivery, or air intake system component.

DETAILED DESCRIPTION OF THE INVENTION

The present invention is directed to a hydrocarbon adsorption material for reduction of evaporative hydrocarbon emissions in a motor vehicle. In general, any known substrate surface, which may come in contact with evaporative hydrocarbons, may be coated with the hydrocarbon adsorbent and binder of the present invention. For example, the hydrocarbon adsorbent can be deposited on one or more surfaces of a fuel storage, fuel delivery, or air intake systems component using a binder, and preferably on the inner surface of such components. Preferably, the substrate surface comprises a polymer or a metal such as aluminum, titanium, stainless steel, a Fe—Cr. alloy or a Cr—Al—Fe alloy in the form of a sheet, mesh, foil, etc. In order to increase the surface area of the adsorbent, it is desirable that the metal substrate be present in a corrugated mode. Typically, the hydrocarbon adsorbent will be deposited on the substrate in a loading of about 0.2 to about 3 $g/in^3$, e.g., 1.25 $g/in^3$.

The adsorbent material may include any known hydrocarbon adsorbent such as activated alumina, porous glass, silica gel, molecular sieve, activated carbon and combinations thereof. Natural and synthetic molecular sieves are particularly effective. Preferably, the molecular sieve will be a natural or synthetic zeolite such as faujasite, chabazite, clinoptilolite, mordenite, silicalite, zeolite X, zeolite Y, ultrastable zeolite Y, ZSM zeolite, offretite, or a beta zeolite. Preferred zeolites include ZSM, Y and beta zeolites. The particularly preferred adsorbent comprises a beta zeolite of the type disclosed in U.S. Pat. No. 6,171,556 incorporated herein by reference in its entirety.

A preferred zeolite-based adsorbent material is a zeolite having a high silica to alumina ratio. Generally, sieve materials having so-called three dimensional pore configurations are preferred over sieve materials having one- or two-dimensional pore configurations, although some of the latter function acceptably well. Acceptable materials typically have a micropore diameter of from about 3 to 8 angstroms. The zeolites, preferably beta zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. The preferred beta zeolites are ion-exchanged beta zeolites, such as H/beta zeolite and Fe/beta zeolite.

Preferred zeolites may include ZSM, Y and beta zeolites, with beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoro acetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfuric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite can be steam treated with steam at from 350 to 900° C. Preferably, the stream treatment is conducted at from 400 to 800° C., and more preferably 500 to 750° C. with a most preferred range being from 550 to 750° C. The steam temperature can be increased at a suitable rate such as from 100 to 600° C. per hour. A useful steam concentration is from 10 to 100% and preferably 30 to 100% with a preferred concentration at from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment is believed to reduce the acidity of the zeolite by removing at least some of the aluminum from the framework of the zeolite. Steam treated zeolites have been found to have an increased durability when used to adsorb hydrocarbons in gaseous streams and to resist coke formation. Preferably, the zeolite can be treated with both leaching and steam treatment. In a particularly preferred process, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed and leached again.

A useful method to treat beta zeolite is disclosed, for example in CN 1059701A, published Mar. 25, 1992 and herein incorporated by reference. This reference discloses a high Si beta zeolite produced by calcining to remove nitrogen compounds from a beta zeolite made through an organoamine template process. Leaching the beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. A useful steam concentration is 100% at a system pressure of 50 to 500 KPa. The duration of the steam treatment is from 0.5 to 5 hours.

Of particular interest with regard to the present invention is the acidity which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite, non-steamed or steamed, has been found to have improved coking resistance, i.e., the formation of coke during engine testing has been significantly reduced. While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. The importance of this can be recognized by both more effective resistance to coking and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

In one embodiment, the substrate surface can be initially coated with a slurry of a high surface area refractory metal oxide, dried for about 0.5 to about 2 hours at about 90 to about 120° C. and thereafter calcined at about 450 to about 650° C. for 0.5 to about 2 hours. High surface area refractory metal oxides are well known in the prior art. Typically, the refractory metal oxide will have a specific surface area of about 60 to about 300 $m^2/g$. Useful refractory metal oxides include alumina, titania, zirconia and mixtures of alumina with one or more of titania, zirconia, ceria, baria and a silicate. Preferably, the refractory metal oxide comprises gamma-alumina.

Thereafter, the refractory metal oxide-coated substrate surface is coated with a slurry of the desired adsorbent and dried (e.g., at about 105° C.). Alternatively, the refractory metal oxide-coated substrate may be coated with separate slurries of the hydrocarbon adsorbent, such as silica gel, molecular sieve and/or activated carbon to create layers, with drying between each layer occurring as described above.

If desired, a further top coat layer of the high surface area refractory metal oxide may be applied on top of the adsorbent, thereafter drying as described above after the application of each layer.

The hydrocarbon adsorbent material will also include a binder that will cause the material to adhere to the surface of the substrate. Such a binder is also referred to as a washcoat binder. Washcoat binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof.

The preferred binder is an organic polymer used in amounts of from 0.5 to 20, preferably 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. Most preferred are thermosetting, elastomeric polymers introduced as a latex into the adsorbent composition, preferably as an aqueous slurry. Upon application of the composition and drying, the binder material fixes the hydrocarbon adsorbent particles to themselves and the substrate surface, and in some cases, can crosslink with itself to provide improved adhesion. This enhances the integrity of the coating, its adhesion to the substrate and provides structural stability under vibrations encountered in motor vehicles. The use of a binder enables the material to adhere to the substrate without the necessity of an undercoat layer. The binder may also comprise additives to improve water resistance and improve adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, polyvinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. A particularly preferred polymeric binder is an acrylic/styrene acrylic copolymer latex.

It has been found that compatibility of the components of a slurry comprising an adsorbent material and a polymeric binder, such as a latex emulsion, is important for maintaining slurry stability and uniformity. For the purpose of the present invention compatibility means that the binder and the adsorbent material remain as a mixture of separate particles in the slurry. It is believed that when the polymeric binder is a latex emulsion and the emulsion and hydrocarbon adsorbent material have electrical charges which cause the emulsion and hydrocarbon adsorbent material to repel each other, the emulsion and hydrocarbon adsorbent material are compatible and the slurry is stable and has a uniform distribution of the hydrocarbon adsorbent material and the polymer latex in the liquid vehicle, e.g. aqueous fluid such as water. If the adsorbent material and latex emulsion particles do not mutually repel each other, irreversible agglomeration of the latex on the adsorbent material will occur. These materials are therefore incompatible and the latex comes out of the emulsion.

For those zeolites that generate a low pH mixture when dispersed in water, additional stabilization can be achieved by increasing the pH. This is important since organic latex binder emulsions commonly used in the art are anionically charged and therefore, typically have a pH greater than 7. Combining a high pH binder emulsion with a low pH zeolite slurry creates instability that often results in slurry coagulation. The pH of the slurry can be controlled depending on the acidity of the adsorbent material, with pH levels being from about 4 to about 10. A preferred range is from about 5 to about 8, more preferably from about 6 to about 7.5.

In another embodiment, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate and mixtures thereof. In one embodiment, a preferred dispersant is a low molecular weight polyacrylic acid in which many of the protons on the acid are replaced with sodium. In a particularly preferred embodiment, low molecular weight anionic dispersants such as sodium dodecylbenzene sulfonate and sodium dioctyl sulfosuccinate have been found to provide excellent zeolite dispersion and zeolite-binder stability. For example, in the case of slurry formulated with high Si/Al ratio SAL-beta zeolite (i.e., sulfuric acid leached beta zeolite) and styrene-acrylic latex binder emulsion, low molecular weight anionic dispersants have been found to provide excellent zeolite dispersion and zeolite-binder stability. A preferred composite comprising about 90 weight percent beta zeolite, about 9 weight percent acrylic polymer latex and about 1 weight percent sodium dodecylbenzene sulfonate or sodium dioctyl sulfosuccinate.

While increasing the slurry pH or adding anionic dispersant alone may provide enough stabilization for the slurry mixture, best results may be obtained when both an increased pH and anionic dispersant are used. For example, for zeolite-based slurries that generate a low pH when dispersed in water and/or a dispersant, additional stabilization can be achieved by increasing the pH, as described above.

The hydrocarbon adsorbent slurries of the present invention, particularly slurries containing polymer latexes, can contain conventional additives such as thickeners, biocides, antioxidants and the like. In one embodiment, a thickener such as a xanthan gum thickener or a carboxymethylcellulose thickener can be used. The thickener makes it possible to achieve a sufficient amount of coating (and hence sufficient hydrocarbon adsorption capacity) on relatively low surface area substrates. The thickener may also serve in a secondary role by increasing slurry stability by steric hinderence of the dispersed particles. It may also aid in the binding of the coating surface.

The improved zeolite binding slurry of the present invention can be applied to, for example, a fuel storage, fuel delivery, or air intake system component of a motor vehicle by any known means in the art. For example, the formulation can be applied by spray coating, powder coating, or brushing or dipping a surface into the zeolite slurry.

EXAMPLES

Example 1

2000 g of SAL-beta zeolite were combined with 1618 g of DI water and subjected to high shear mixing for 10 minutes. The resulting mixture was then milled to a particle size 90%<25 um using a continuous type mill. 150 g of the milled zeolite slurry was placed in a separate container, and the pH was increased to 6 by addition of 10% potassium hydroxide solution in DI water. The slurry was mixed for 2 hours by rolling on a roll mill, and the pH was readjusted to 6, if necessary. Subsequently, 3.19 g of commercially available sodium dodecylbenzene sulfonate was added, and the resulting slurry was mixed on a roll mill for 5 minutes. Similarly, 13.99 g of a commercially available styrene-acrylic latex binder latex binder, and 7.98 g of a commercially available thickener were added with mixing after each addition. The resulting slurry was coated onto a 25 cpsi metallic substrate at a loading of 1.45 g/in$^3$ (dry basis) and dried at 100° C. Coating adhesion and butane adsorption capacity were evaluated and found to be excellent.

What is claimed is:

1. An improved hydrocarbon adsorbent washcoat slurry formulation comprising:
   a) one or more molecular sieves for the adsorption of evaporative hydrocarbons;
   b) an organic polymer binder to improve the adhesion of the hydrocarbon adsorbent to a surface; and
   c) an anionic dispersant selected from the group consisting of sodium dodecylbenzene sulfonate and sodium dioctyl sulfosuccinate to stabilize said slurry formulation.

2. The improved hydrocarbon adsorbent washcoat slurry formulation of claim 1, wherein said molecular sieve is selected from the group consisting of faujasite, chabazite, clinoptilolite, mordenite, silicalite, zeolite X, zeolite Y, ultrastable zeolite Y, ZSM zeolite, offretite, or a beta zeolite.

3. The improved hydrocarbon adsorbent washcoat slurry formulation of claim 2, wherein said molecular sieve is beta zeolite.

4. The improved hydrocarbon adsorbent washcoat slurry formulation of claim 1, wherein said organic polymer binder is selected from the group consisting of polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, polyvinyl alcohol, thermoplastic polyesters, thermosetting polyesters, poly(phenylene oxide), poly(phenylene sulfide), fluorinated polymers, poly (tetrafluoroethylene) polyvinylidene fluoride, poly(vinylfluoride), chloro/fluoro copolymers, ethylene chlorotrifluoro-ethylene copolymer, polyamide, phenolic resins and epoxy resins, polyurethane, and silicone polymers.

5. The improved hydrocarbon adsorbent washcoat slurry formulation of claim 4, wherein said organic polymer binder is a latex.

6. The improved hydrocarbon adsorbent washcoat slurry formulation of claim 5, wherein said latex is an acrylic/styrene acrylic copolymer.

7. The improved hydrocarbon adsorbent washcoat slurry formulation of claim 1, wherein said slurry formulation further comprises a thickener selected from the group consisting of xanthan gums and carboxymethylcelluloses.

8. The improved hydrocarbon adsorbent washcoat slurry formulation of claim 1, wherein said anionic dispersant is sodium dodecylbenzene sulfonate.

9. The improved hydrocarbon adsorbent washcoat slurry formulation of claim 1, wherein said anionic dispersant is sodium dioctyl sulfosuccinate.

10. A substrate selected from the group consisting of the surface of a fuel storage, fuel delivery, or air intake system component of a motor vehicle to which is coated said hydrocarbon adsorbent washcoat slurry of claim 1.

11. An improved hydrocarbon adsorbent washcoat slurry formulation comprising:
    a) one or more molecular sieves for the adsorption of evaporative hydrocarbons;
    b) an organic polymer binder to improve the adhesion of the hydrocarbon adsorbent to the surface; and
    c) said slurry having a pH from about 4 to about 10 to stabilize said slurry formulation.

12. The improved hydrocarbon adsorbent washcoat slurry formulation of claim 11, wherein said formulation further comprises an anionic dispersant for further stabilization of said slurry formulation.

13. The improved hydrocarbon adsorbent washcoat slurry formulation of claim 12, wherein said anionic dispersant is sodium dodecylbenzene sulfonate.

14. The improved hydrocarbon adsorbent washcoat slurry formulation of claim 12, wherein said anionic dispersant is sodium dioctyl sulfosuccinate.

15. The improved hydrocarbon adsorbent washcoat slurry formulation of claim 11, wherein said slurry formulation further comprises a thickener selected from the group consisting of xanthan gums and carboxymethylcelluloses.

16. The improved hydrocarbon adsorbent washcoat slurry formulation of claim 11, wherein said molecular sieve is selected from the group consisting of faujasite, chabazite, clinoptilolite, mordenite, silicalite, zeolite X, zeolite Y, ultrastable zeolite Y, ZSM zeolite, offretite, or a beta zeolite.

17. The improved hydrocarbon adsorbent washcoat slurry formulation of claim 16, wherein said molecular sieve is beta zeolite.

18. The improved zeolite washcoat formulation of claim 11, wherein said organic polymer binder is a latex.

19. The improved zeolite washcoat formulation of claim 18, wherein said latex is an acrylic/styrene acrylic copolymer.

20. A substrate selected from the group consisting of the surface of a fuel storage, fuel delivery, or air intake system component of a motor vehicle to which is coated said hydrocarbon adsorbent washcoat slurry of claim 11.

* * * * *